United States Patent [19]

Feron et al.

[11] Patent Number: 4,888,495
[45] Date of Patent: Dec. 19, 1989

[54] POWER ADAPTER FOR ELECTRICAL INSTALLATIONS AND ESPECIALLY DOMESTIC INSTALLATIONS WITH SO-CALLED CARRIER CURRENT CONTROL

[75] Inventors: Paul Feron, Toulouse; Daniel Tougne, Cahors, both of France

[73] Assignees: Manufacture d'Appareillage Electrique Cahors, Cahors; Electricite de France, Toulouse, both of France

[21] Appl. No.: 64,588

[22] Filed: Jun. 22, 1987

[30] Foreign Application Priority Data

Jun. 20, 1986 [FR] France ................... 86 08914

[51] Int. Cl.[4] ............... H02J 13/00; H04M 11/04
[52] U.S. Cl. .................. 307/39; 340/310 A; 307/35
[58] Field of Search ............ 307/39, 35, 38, 40, 307/41; 340/310 R, 310 A

[56] References Cited

U.S. PATENT DOCUMENTS

| | | | |
|---|---|---|---|
| 4,005,399 | 1/1977 | Pazemenas | 340/310 R |
| 4,211,933 | 7/1980 | Hedges et al. | 307/35 |
| 4,321,477 | 3/1982 | Bartlett . | |
| 4,360,881 | 11/1982 | Martinson | 364/493 |
| 4,453,156 | 6/1984 | Brown et al. | 340/310 R |
| 4,471,232 | 9/1984 | Peddie et al. | 307/35 |
| 4,507,646 | 3/1985 | Hamlin et al. | 340/310 R |
| 4,510,398 | 4/1985 | Culp et al. . | |
| 4,714,912 | 12/1987 | Roberts et al. | 340/310 R |

FOREIGN PATENT DOCUMENTS

| | | |
|---|---|---|
| 0023254 | 2/1981 | European Pat. Off. . |
| 0028882 | 5/1981 | European Pat. Off. . |
| 0093882 | 11/1983 | European Pat. Off. . |
| 3031163 | 3/1982 | Fed. Rep. of Germany . |
| 3113015 | 9/1982 | Fed. Rep. of Germany . |
| 2282181 | 3/1976 | France . |
| 2381407 | 9/1978 | France . |
| 2404326 | 12/1981 | France . |
| 2448802 | 3/1982 | France . |
| 2492183 | 4/1982 | France . |
| 2541052 | 8/1984 | France . |
| WO82/03299 | 9/1982 | PCT Int'l Appl. . |

*Primary Examiner*—William M. Shoop, Jr.
*Assistant Examiner*—Sharon D. Logan
*Attorney, Agent, or Firm*—Young & Thompson

[57] ABSTRACT

The power adapter (114) has a power input (17, 18) and a power output (117) connected to a plurality of power consumption points (3, 4, 6, 7, 8, 9, 11) and a load-shedding device so designed that, when the consumed power exceeds a predetermined threshold value, the supply of current to at least a predetermined number (7, 8, 11) of power consumption points is interrupted in cascase in a pre-established order until the threshold value is complied with, whereupon the supply of current to these points is then restored in the reverse order. The load-shedding device includes a transmitting circuit for delivering at the power output (117) control signals to which receiving devices (115) are selectively responsive in order to interrupt or restore the supply of current to at least a predetermined number (7, 8, 11) of power consumption points.

2 Claims, 5 Drawing Sheets

FIG_4

POWER ADAPTER FOR ELECTRICAL INSTALLATIONS AND ESPECIALLY DOMESTIC INSTALLATIONS WITH SO-CALLED CARRIER CURRENT CONTROL

BACKGROUND OF THE INVENTION

1. Field of the Invention

The present invention relates to a power adapter for electrical installations and especially domestic installations with so-called "carrier current" control.

2. Description of the Prior Art

It is already known that the rates charged for electric service by power distribution utilities increase with the maximum power for which the user has applied under service contract. In view of this situation, it has been proposed to adopt units designated as "load-shedders" having one input connected to the output of the general circuit-breaker and a number of power outputs each connected to one or a number of power consumption points. When the consumption exceeds a predetermined threshold value which is slightly lower than the service contract power, the load-shedder automatically disconnects these power outputs in cascade in a predetermined order of priority until the power consumption is restored to the service contract level. Certain units of this type enable the user to program the level of priority of power outputs or in other words the order in which said outputs are disconnected in the event of threshold overshoot.

Another known form of rate schedule is the time-differentiated scale in which the kilowatt-hour price level varies according to the time of day or night, thus giving rise to the night-rate schedule. In another billing system at present in use, a reduced rate is applied on a year-round basis except for a few so-called "peak" days in which the tariff, or billing rate, is particularly high. In the system just mentioned, a warning signal is sent over the network a predetermined time before the high rate comes into effect, thus urging the user to moderate his power consumption. A second signal is then delivered in order to switch the meter to the new billing rate.

Co-pending U.S. patent application Ser. No. 877,759 filed by the present Applicant as joint owner on June 24, 1986 accordingly describes a power-adapting device which enables the user both to maintain a moderate maximum power level and to optimize his power consumption as a function of the prevailing rate charged.

In accordance with the patent application cited in the foregoing, the power adapter comprises a power input, a plurality of power outputs and a load-shedding device so designed that when the power consumption oversteps a predetermined threshold value, at least a certain number of power outputs ar disconnected in cascade in a pre-established order until said power consumption is restored to said threshold value and said power outputs are subsequently re-connected in the reverse order. The power adapter is essentially provided in addition with means for selectively assigning an erasure permission to at least a certain number of power outputs independently of the pre-established order aforesaid, and with erasing means responsive to a signal which is representative of the power cost, the outputs to which an erasure permission has been assigned being disconnected by said signal when the power cost is at a high value.

In accordance with U.S. patent application Ser. No. 877,759, orders for load-shedding on non-priority consumers are carried out directly at the level of the power adapter. When an adapter of this type is fitted in an existing domestic installation, the outgoing lines for supplying current to sheddable equipment units (or in other words non-priority units) must therefore be separately and distinctly available, for example on a distribution panel, in order to ensure that they can be readily connected to the outputs of the adapter without having to proceed to a complete rearrangement of the electric wiring system of the installation.

In most domestic electrical installations, however, no provision is made for any distribution panel of the type just mentioned. Only a single supply line is led out from the circuit-breaker to supply a number of appliances in parallel. In order to include the above-mentioned power adapter in this type of installation, it is consequently necessary to carry out a practically total reorganization of the electrical system and this carries a heavy cost penalty in the majority of instances.

The object of the present invention is to propose a power adapter which exactly satisfies the same functions as the adapter described in the patent application cited earlier while offering the same advantages and permitting integration in an existing installation without any need for extensive wiring operations.

SUMMARY OF THE INVENTION

Thus the power adapter contemplated by the invention includes a power input and a power output connected to a plurality of power consumption points and a load-shedding device so designed that, when the electric power consumed by all the power points aforesaid exceeds a predetermined threshold value, the supply of current to at least a predetermined number of power consumption points is interrupted in cascade in a pre-established order until the threshold value is complied with, whereupon the supply of current to these points is then restored in the reverse order.

In accordance with a distinctive feature of the invention, the load-shedding device includes a transmitting circuit for delivering at the power output control signals to which receiving devices are selectively responsive in order to interrupt or restore the supply of current to at least a predetermined number of power consumption points, said receiving devices being connected in series with said points and upstream of these latter.

Thus the adapter in accordance with the invention has only one power output through which the load-shedding and load-restoring orders are delivered to non-priority consumers. There is no specific wiring for transmission of these orders and it is consequently a very easy matter to incorporate a unit of this type in an existing domestic power installation. Moreover, the receiving devices are also easy to install and they may be employed if necessary only momentarily, for example as a function of climatic conditions. The power adapter in accordance with the invention therefore permits flexible and rapid utilization.

DETAILED DESCRIPTION OF THE INVENTION

Figure 1:
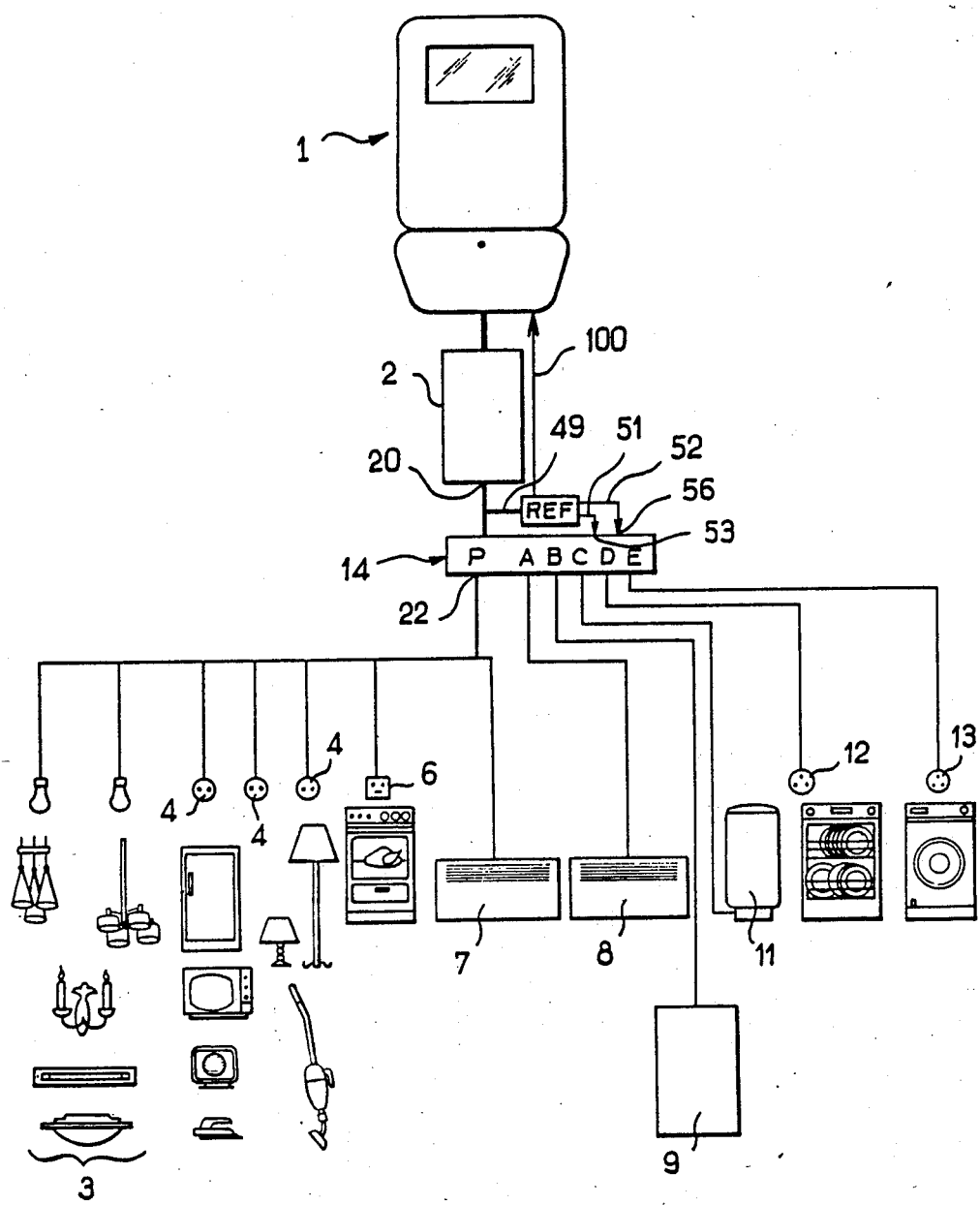
FIG. 1 is a schematic view of a domestic electrical installation which utilizes a power adapter in accordance with U.S. patent application Ser. No. 877,759.

The example which will now be described relates to a single-phase domestic installation. As shown in FIG. 1, the installation includes a counter 1 which is connected by means of a differential circuit-breaker 2 to different power-consumption points, namely lighting points 3, low-current wall sockets 4, a power socket 6 for an electric cooker, one or a number of electric heating appliances 7 in rooms occupied during the day, one or a number of electric heating appliances 8 in rooms occupied at night, an auxiliary heating appliance 9 with combustion initiated by electric ignition, a water heater 11, a power socket 12 for a dish-washer and a power socket 13 for a washing machine.

The power, adapter 14 in accordance with U.S. patent application Ser. No. 877,759 is interposed between the differential circuit-breaker 2 and the entire assembly of appliances.

Figure 2:
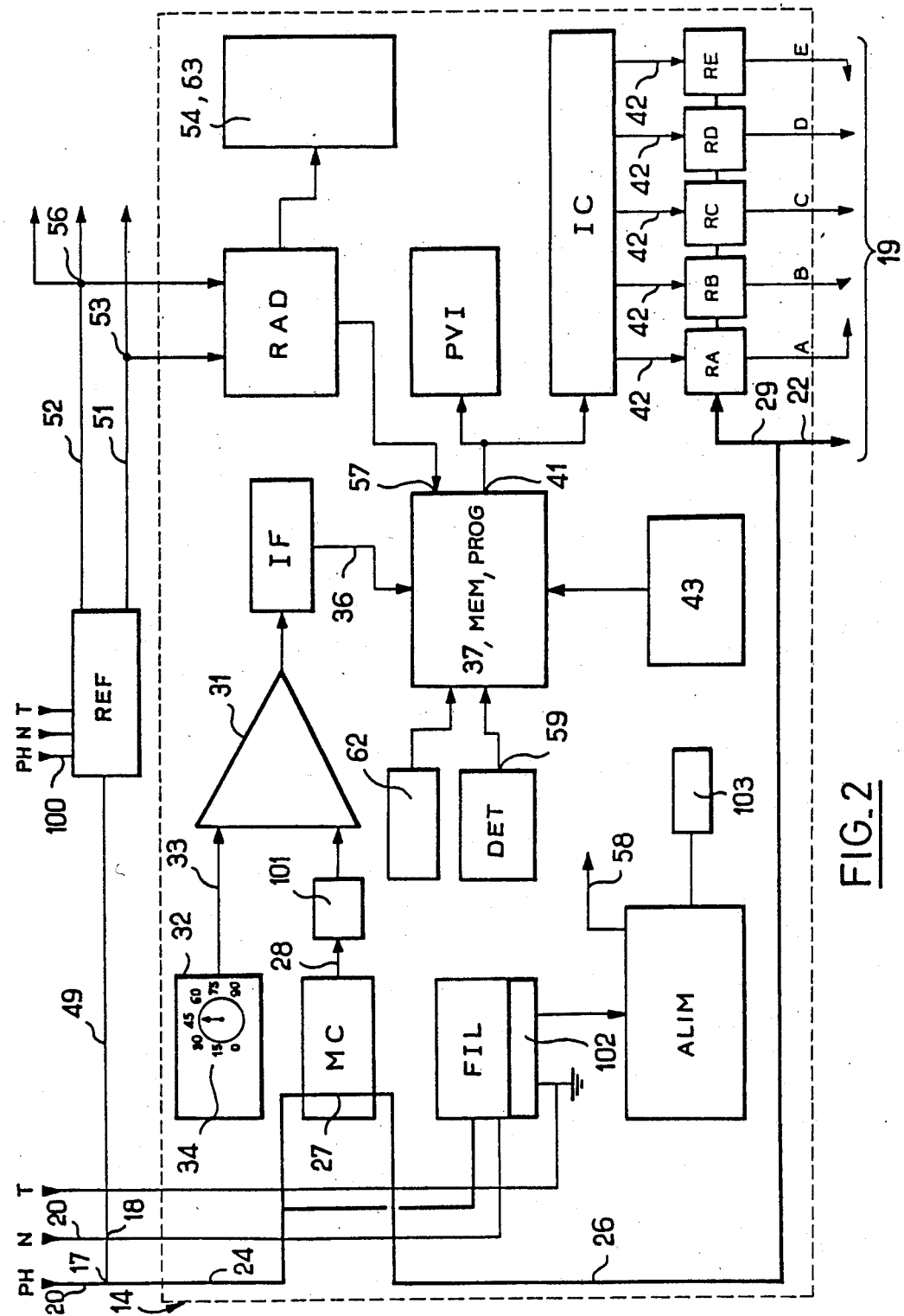
FIG. 2 is a block diagram of said adapter.

As shown in FIG. 2, the adapter 14 is provided with a phase terminal 17 and a neutral terminal 18 which are connected to output terminals of the differential circuit-breaker 2 by means of a two-wire link 20 (shown in FIG. 1).

The adapter 14 also includes an output terminal block 19 provided with six phase terminals designated respectively by the reference numeral 22 and by the reference letters A, B, C, D, E.

The so-called "priority" phase terminal 22 is permanently short-circuited with the input phase terminal 17 via lines 24, 26, said lines being connected to each other via a conductive path 27 through a current-measuring device MC, the function of which will become apparent hereinafter.

As shown in FIG. 1, the priority output terminal 22 is connected to the power-consumption points 3, 4, 6 and 7 defined earlier since it is a recognized fact that the supply of these points cannot be interrupted without considerable inconvenience.

The power outputs A, B, C connected in the example under consideration to an appliance for heating rooms occupied at night, to an auxiliary heating appliance and to a water heater are designated as non-priority electrical appliances. The power outputs D and E which, in the example considered, are connected to the dish-washer 12 and to the washing machine 13 respectively are designated as semi-priority electrical appliances. Under conditions which will be described hereinafter, the supply of power to these different outputs A to E can be interrupted by relays (or equivalent devices of the triac type) respectively designated by the references RA, RB, RC, RD, RE (as shown in FIG. 2).

The supply of power to the non-priority outputs A, B, C can be interrupted when the current consumed by the installation exceeds a predetermined threshold value.

To this end, the current-measuring device MC (shown in FIG. 2) delivers at its output 28 a potential which is a function of the current on the conductive path 27 located upstream of a branch line 29 which connects the line 26 to the outputs A, B, C, D, E through the power stage of the relays RA, RB, RC, RD, RE. The current on the conductive path 27 is therefore the total current consumed by the installation. The output 28 of the measuring device MC is connected through a filter 101 to one of the inputs of a comparator 31, the other input of which is connected to the output 33 of a value-setting device 32. The potential which is present on the output 33 of the device 32 is a unction of the position of a rotary selector 34 which is accessible from the exterior of the adapter 14. The selector 34 is displaceable with respect to a scale graduated in amperes. Under service conditions, the index point of the selector 34 is placed opposite to the value in amperes or in watts corresponding to the service contract.

At its output, the comparator 31 delivers a binary signal which assumes one of the levels 0 or 1 when the current measured on the conductive path 27 is below a threshold value which is in turn slightly lower than the maximum current for which the user has applied under service contract and assumes the other level when the current measured on the conductive path 27 is higher than said threshold value.

The output of the comparator 31 is connected to an input 36 of a microprocessor 37 via a signal-matching interface IF.

The microprocessor 37 operates in conjunction with a memory MEM and a programmer PROG. The microprocessor 37 has an output 41 which is connected to a visualization peripheral PVI and to a control interface IC, each output 42 of which is connected to each relay RA, RB, RC, RD, RE.

The user has access to the programmer PROG by means of a keyboard 43 which enables him to define the order in which the non-priority outputs A, B, C have to be disconnected when the current on the conductive path 27 exceeds the threshold value.

Supply of power to the non-priority outputs A, B, C and to the semi-priority outputs D, E can be interrupted during periods of "peak-load pricing" or power consumption at high billing rates. In the example herein described, the installation includes a relay REF having an input 49 connected to the phase upstream of the terminal 17, an output 51 or so-called "advance notice" output and a rate change control output 52. The relay REF is also connected to the counter 1 by means of a link 100 (FIGS. 1 and 2) for switching this latter as a function of the prevailing rate charged. The relay REF is responsive to various signals which are carried by the network and the frequency of which is different from the distribution frequency. In response to a first signal or so-called "advance notice" signal, the output 51 of the relay REF is activated. In response to a second signal or rate change signal, the output 52 of the relay REF is activated in this case. The output 51 is connected to an advance notice terminal 53 of the adapter 14. The output 52 is connected to a terminal 56 of the adapter 14. Within the adapter 14, the terminals 53 and 56 are connected to an input 57 of the microprocessor 37 via an adaptation relay RAD which, as a function of the state of the outputs 51 and 52, delivers to the input 57 of the microprocessor a binary signal which is acceptable by this latter. For instance, on reception of the high-price rate-change signal, the relay REF initiates a transition of its output 52 to the activated state until another type of signal is received on the input 49 of the relay REF in order to indicate restoration of the power supply to the lower rate, or "off-peak" pricing. The state of the microprocessor input 57 is therefore a function of the prevailing rate charged. The relay RAD initiates turn-on of a warning lamp 54 when the output 51 is activated.

In accordance with the conditions which are clearly explained in the patent Application cited earlier, the user has defined beforehand by means of the programmer PROG one or a number of the outputs A, B, C, D, E which he desires to disconnect when the billing rate is at a peak-load level. As a function of this program and of the signal on its input 57, the microprocessor 37 initiates opening of the relays associated with these outputs when the billing rate is at the high value.

A supply unit ALIM controlled by an on-off switch 103 draws energy from the line 24 by means of a filter FIL and a fuse 102. The unit ALIM supplies current at 10 or 22 volts to all the power-consuming elements of the adapter 14. In order not to complicate the figure unduly, the corresponding connections are represented schematically by the arrow 58. The unit ALIM includes a transformer and a rectifier which are supplied with power from the grid system, and a storage battery for supplying the output 58 in the event of a current interruption in the grid system. The unit ALIM includes means for charging the storage battery as long as necessary from the grid system when this latter delivers current. A detector DET delivers at its output 59 a signal having two levels according to whether current is supplied or not supplied by the grid system. This binary signal is delivered to an input of the microprocessor 37. When the occurrence of an interruption of the grid system current supply has been determined from the state of said input by said microprocessor 37, this latter initiates operation in the minimum mode in which only the memory MEM is supplied. Thus the power consumption of the adapter 14 will be of minimum value and the contents of the memory MEM will consequently be maintained as long as possible, taking into account the necessarily limited capacity of the storage battery contained in the unit ALIM.

The programming keyboard 43 which is connected to the microprocessor 37 provides the possibility of choosing between a reading mode and a programming mode. A selector 62 makes it possible to select between on the one hand a load-shedding mode and on the other hand an erasure mode during high billing-rate periods. A respective indicator lamp 63 lights-up in order to indicate the mode chosen.

Finally, it will be noted that the memory MEM includes a read-only memory (ROM) containing invariable data of the adapter and in particular the programs of power adapter operation. The memory MEM also contains in a random-access memory (RAM) the following data :
one memory per priority level, the content of which is related to the address of the relay which is assigned thereto by the user. One of its binary characters contains the programming of this channel in regard to the peak-hour billing rate and another characterizes a power-supply interruption in the same case ;
the display memories which are necessary in order to ensure permanent display ;
a time-counting memory ;
an erasure memory which indicates whether the present period is a high-billing-rate period or not ;
a reference value overshoot memory ;
a system-state memory ;
a memory for hourly permission to re-connect ;
a so-called reading/programming memory which contains the display management mode selected by the user, namely reading/programming and erasure/load-shedding ;
a memory indicating a change of display.

In U.S. patent application Ser. No. 877,759 cited earlier, the management of the different functions of the power adapter described in the foregoing has already been explained in detail with reference to flow diagrams.

In the following description of the power adapter in accordance with the present invention, emphasis will be laid essentially on the differences in structure between this device and the adapter described in the foregoing.

In the example chosen (FIG. 3), said power adapter 114 equips a single-phase domestic installation which is identical with that described with reference to FIG. 1. In this case, a filter 104 is interposed between the output of the differential circuit-breaker 2 and the power input of the adapter 114. The object of this filter 104 is to attenuate disturbances which are liable to be generated by a similar installation operating in the vicinity in a manner which will hereinafter be explained in detail.

Furthermore, the power adapter 114 is now provided with only one power output 117 which is connected by means of supply lines 140 forming a power network 150 at the different power consumption points 3, 4, 6, 7, 8, 9, 11 of the installation. A receiving device 115 which will be described in detail below is interposed between each non-priority or semi-priority consumption point at which the power supply can be interrupted (for example in the case of heating rooms occupied during the night or in the case of the auxiliary heating unit, the water heater, the dish-washer and the washing machine).

Figure 4:
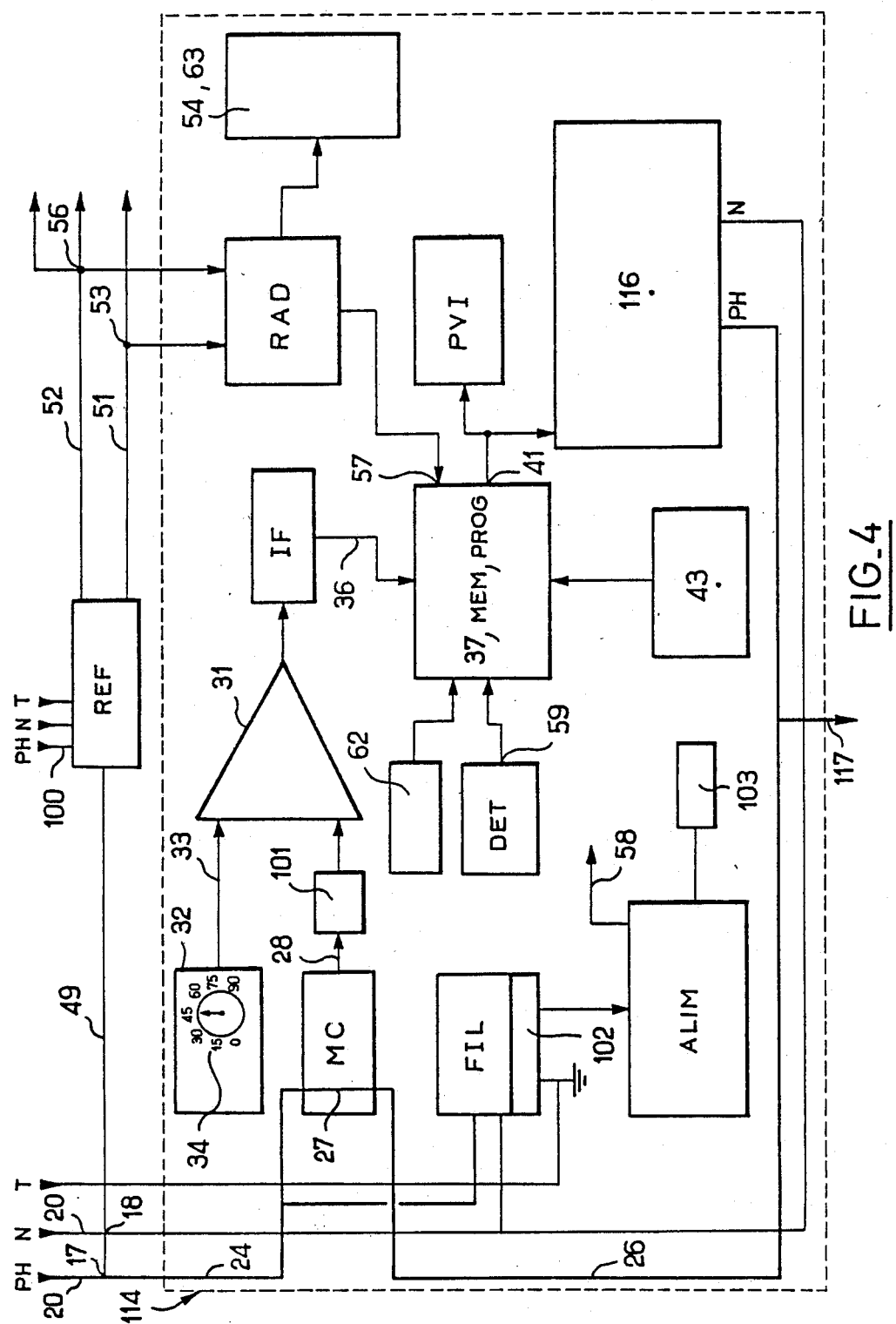
FIG. 4 is a block diagram of said adapter.

In FIG. 4 which is a block diagram of the adapter 114, it is apparent that, in comparison with the adapter 14 of FIG. 2, the control interface IC and the relays RA to RE for putting non-priority and semipriority equipment units into or out of service have been replaced by a transmitting circuit 116 which serves as a transmission interface between the output 41 of the data-processing circuits 37, MEM, PROG of the load-shedding device and the power output 117 of the adapter 114.

Said transmitting circuit 116 is adapted to deliver on the power output 117 control signals which are superimposed on the voltage wave delivered by the utility power line and to which the receiving devices 115 are selectively responsive.

Figure 5:
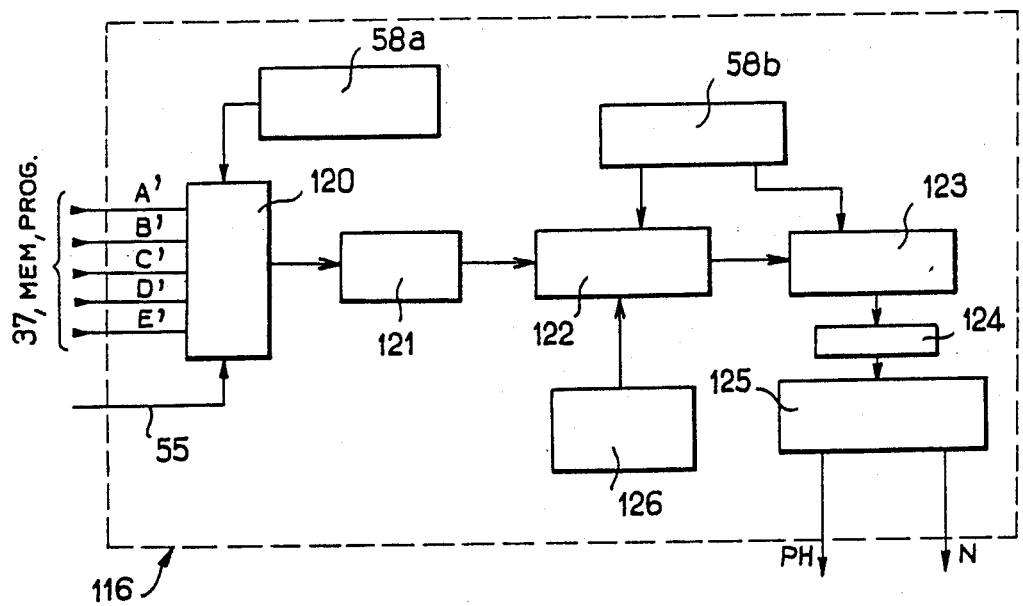
FIG. 5 is a block diagram of the transmitting circuit of said adapter.

As shown in FIG. 5, the transmitting circuit 116 comprises a coding circuit 120. By means of this coding circuit, the information which has the function of controlling the receivers 115 and is delivered by the microprocessor 37 in parallel form is converted to a binary-coded control signal made up of a series of pulses or of logic bits. More specifically, the microprocessor 37 of the load-shedding device of the adapter delivers five parallel logic signals A', B', C', D', E' which have the intended function of initiating either disconnection or reconnection of non-priority equipment units and which constitute data bits. The coding circuit 120 converts these parallel signals to a series item of information comprising supplementary bits required for transmission as well as address bits (not employed in the example considered), these bits being "frozen" in the same logic state in the case of the transmitter 116 and the receivers 115. The series message thus constituted contains the information for controlling the receiving devices of the installation or in other words contains a number of data bits corresponding to the number of receivers of different types (five in the example considered), namely receivers which are independently and selectively responsive to one of the data bits of the series signal. By way of example, if it is desired to control two receiving devices simultaneously, it is only necessary to assign one and the same data bit to said devices at the level of the signal delivered by the coding circuit of the transmitter circuit.

Moreover, in order to carry out reliable processing of the order or control operation, it must be ensured that a message received is confirmed by a second message which is identical with the first, thereby guarding against any accidental control operations.

Transmission of the signal whose duration is shorter than or equal to one second is initiated by the microprocessor of the adapter as a function of the programming and of the intensity measured by the microprocessor, via a transmission control line 155 which terminates at the coding circuit 120. Transmission of the signal is not continuous but takes place solely when a load shed (or load restoration) is necessary and, in parallel, recurrently at eight-minute intervals in order to confirm or to re-update the state of the receivers.

Figure 3:
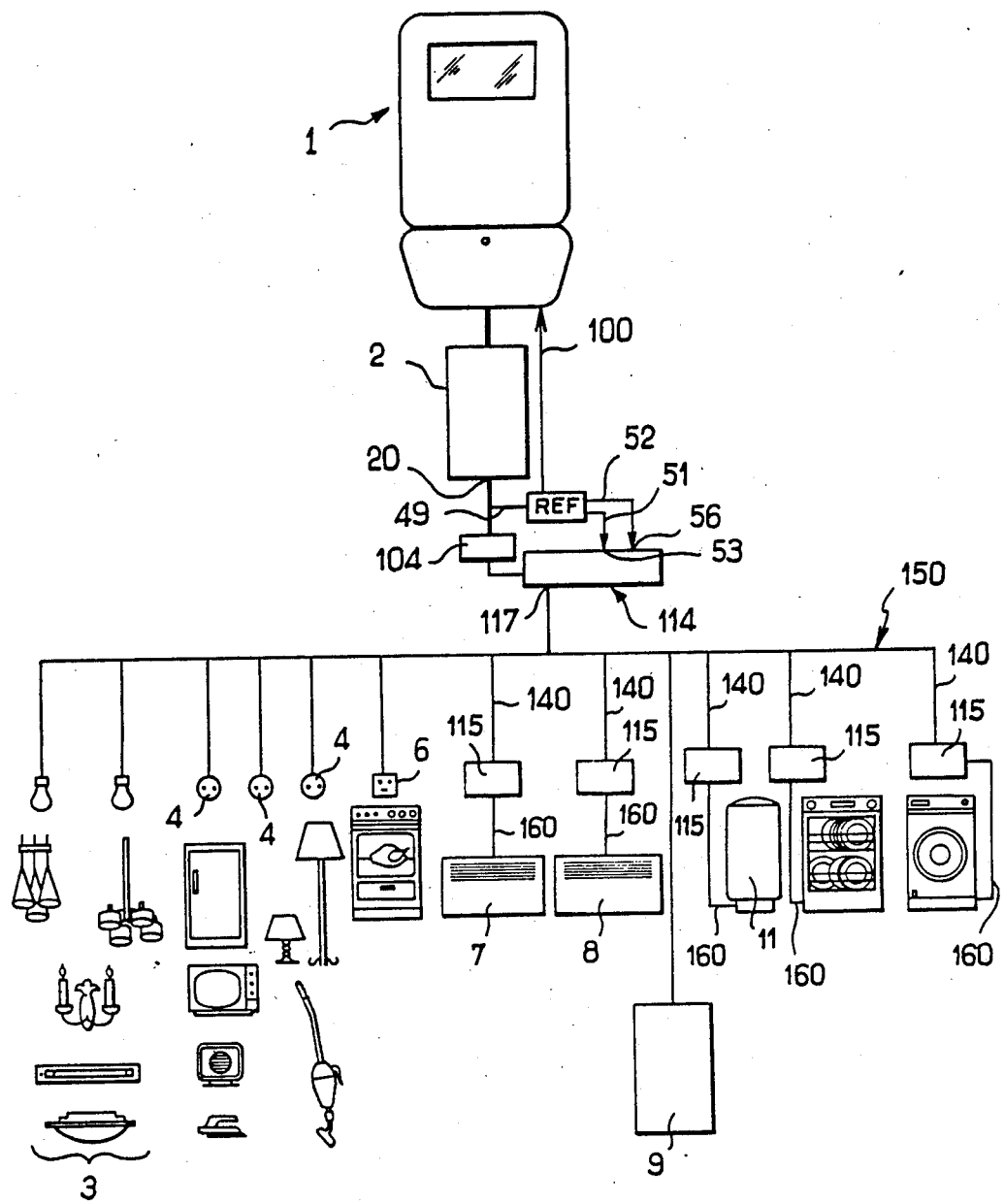
FIG. 3 is a schematic view of a domestic electrical installation which utilizes a power adapter in accordance with the invention.

The signal delivered by the coding circuit 120 passes through an optocoupler circuit 121 which provides electrical isolation between on the one hand the coding circuit 120 and the data-processing circuits 37, MEM, PROG of the load-shedding device to which they are connected and on the other hand the power portion of the transmitting circuit, then modulates in an all-or-none mode within a mixing circuit 122 a carrier wave having a high frequency of the order of 120 kHz which is delivered by an oscillator 126. This high-frequency carrier wave thus permits transmission of the control signal via leads 140, 160 (as shown in FIG. 3) for supplying the power-consumption points.

Prior to transmission over the power network 150 (shown in FIG. 3), the control signal mixed with the carrier wave passes through an impedance-matching circuit 123 which serves to provide a drive to the network at low impedance in such a manner as to make the control of the receiving devices insensitive to variations in impedance of the power network. Said control signal then passes through a clipping circuit 124 which protects the load-shedding device against a return of spurious pulses generated by said network to said load-shedding device. Finally, said control signal passes through an isolating circuit 125 having the function of isolating the transmitting circuit 116 from the power network. Furthermore, two separate and distinct supplies 58a, 58b prevent any power-control coupling by the supply.

The signal transmitted over the power network does not disturb the operation of domestic appliances or radio sets by reason of the relatively low frequency and short duration of the transmission and especially the low power level of the carrier wave which does not exceed 5 mW.

The present Applicant has also established the fact that transmission of the signal remains unaffected by parasites produced either by domestic appliances or by the operation of devices having motors together with capacitors.

Moreover, the filter 104 placed upstream of the load-shedding device and tuned to the frequency of the carrier wave (120 kHz) attenuates by 20 dB at this frequency the return of the signal to the distribution network and therefore attenuates any interference with an adjacent installation equipped with the same system.

Although this is not an essential requirement, the filter 104 can in practice be integrated with the casing of the adapter 114.

Figure 6:
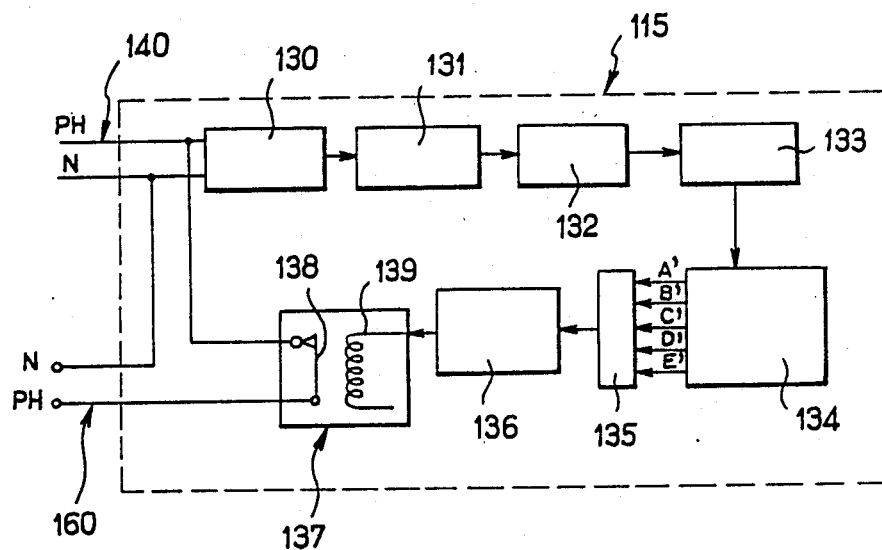
FIG. 6 is a block diagram of a receiving device in accordance with the invention.

In FIG. 6 which is a block diagram of a receiving device 115, it is apparent that the control signal mixed with the 120 kHz carrier wave and which has been carried by the power leads 140 passes first through an isolating circuit 130 having the function of isolating the electronic circuitry of the receiving device from the power network and through a clipping circuit 131 which removes the spurious pulses before being applied to a selective filter 132 which is tuned to the carrier-wave frequency (120 kHz in the example considered) so as to remove the unwanted signals having a frequency which is different from that of the carrier wave and is liable to disturb the transmission of the control signal. This control signal is then applied to a frequency-detecting circuit 133 which restitutes the control signal at its output in the form of a series of pulses or in other words in the form in which said signal appears at the output of the coding circuit of the transmitter.

The signal delivered by the frequency-detecting circuit 133 then passes through a decoding circuit 134 which restitutes five parallel logic data A', B', C', D', E' at the terminals of its five outputs respectively. The form in which said control signal is represented by said data is identical with the form of said signal at the output of the microprocessor of the load-shedding device. These five data A', B', C', D', E' are applied to a selecting circuit 135 which assignes one of said data to the control of the receiving device 115 considered, which means that the selected datum (A' or B' or C' or D' or E') will alone be recorded at the level of said receiver. After passing through a power interface 136, said datum is employed for controlling a relay 137. Energization of the coil 139 of said relay 137 initiates, for example, opening of its contact 138, thereby interrupting or disconnecting the supply line 140, 160 from the electrical household equipment to which the receiver 115 is connected.

Each receiving device of the type described in the foregoing is supplied in a conventional manner by means of a system (not shown in the drawings) which includes a transformer and rectifier, filtering and regulating circuits.

Any message received by a receiving device is stored in memory at the level of the decoding circuit until a fresh message is received.

In the event of failure of the line supply, no safety operation is performed at the level of the receiving devices since these latter return in this case to the rest position in which their relay is in the closed position and supply of current to the corresponding equipment is ensured. This does not constitute a disadvantage since supply of the transmitting circuit of the adapter is maintained. In the event of overshoot of the current consumed by the installation after an interruption of the line supply, a fresh message is transmitted by the adapter, with the result that the receiving devices are again positioned correctly.

Each receiving device is contained within a casing which includes a connecting device adapted to be connected to the conventional domestic current-supply wall plugs, namely to 10-amp two-pole plug sockets, 16-amp and 20-amp sockets with ground connections and to devices for connecting convectors. The receiving devices are therefore removable devices which can readily be placed in position by the user in accordance with requirements.

As will readily be understood, the invention is not limited to the examples hereinabove described with reference to the accompanying drawings and many alternative arrangements may accordingly be contemplated without thereby departing either from the scope or the spirit of the invention.

What is claimed is:

1. A power adapter comprising:
   a power input,
   a power output adapted to be connected in use to a plurality of power consumption points,
   means for detecting the current through the power input,
   means for comparing said current with a threshold,
   means for successively disconnecting power consumption points of said plurality in a pre-established order when said current is higher than said threshold and then successively re-connecting said disconnected power consumption points in the reverse of said pre-established order when said current is lower than said threshold,
   programming means for programming said pre-established order and for selectively assigning an erasure permission to at least one power consumption point from said plurality independently of said pre-established order,
   input means of receiving a signal representing an external condition,
   erasing means responsive to said signal for selectively disconnecting said at least one power consumption point upon detection of a predetermined condition of said signal, and
   a transmitting circuit which is responsive to the means for successively disconnecting and to the erasing means, for delivering at the power output control signals to which receiving devices are selectively responsive in order to interrupt or restore the supply of current to at least a predetermined number of power consumption points, said receiving devices being connected in series with said points and upstream of these latter.

2. A power adapter including a power input, a power output adapted to be connected to a plurality of power consumption points, and a load-shedding device comprising:
   two detection means for detection two parameters related to the value of the power consumption,
   receiving devices connected in series with said points and upstream of these latter, and
   transmitting means responsive to the two detection means for delivering at the power output control signals to which said receiving devices are selectively responsive in order to interrupt or restore the supply of current to said power consumption points, wherein said transmitting means are adapted to control different consumption points depending upon which of said detection means has activated said transmitting means for controlling interruption and restoration of current to said power consumption points.

* * * * *

UNITED STATES PATENT AND TRADEMARK OFFICE
CERTIFICATE OF CORRECTION

PATENT NO. : 4,888,495
DATED : December 19, 1989
INVENTOR(S) : Paul FERON et al.

It is certified that error appears in the above—identified patent and that said Letters Patent is hereby corrected as shown below:

On the title page, item [73]:

Change the name of one of the assignees, from "Manufacture d'Appareillage Electrique Cahors" to --Manufacture d'Appareillage Electrique de Cahors--

Signed and Sealed this

Fifth Day of February, 1991

*Attest:*

HARRY F. MANBECK, JR.

*Attesting Officer*      *Commissioner of Patents and Trademarks*